Patented Apr. 11, 1944

2,346,568

UNITED STATES PATENT OFFICE 2,346,568

PROCESS FOR THE PRODUCTION OF SULPHONYL BROMIDE DERIVATIVES

Arthur L. Fox, Woodstown, N. J., assignor to E. I. du Pont de Nemours & Company, Wilmington, Del., a corporation of Delaware No Drawing. Application November 17, 1939, Serial No. 305,013

3 Claims. (Cl. 204—163)

This invention relates to the preparation of chemical compounds and compositions by reacting saturated aliphatic or alicyclic compounds with admixed sulphur dioxide and bromine.

Methods for solubilizing hydrocarbons including saturated aliphatic hydrocarbons are described in U. S. Patent No. 2,046,090 and comprise reacting them with sulphur dioxide or selenium or tellurium dioxide and a halogen, particularly, sulphur dioxide and chlorine in the dark or in the presence of light and hydrolyzing the reaction products.

This invention has for an object the improvement of the aforesaid prior art processes. A further object is the preparation of solubilized hydrocarbons in increased yields by the aforesaid reaction. A still further object is to prevent the formation of undesirable by-products in the aforesaid general reaction. A still further object is to prepare a uniform product free from undesirable components. A still further object is to provide a method for causing the aforesaid general reaction to proceed at a more rapid rate and thereby increase the efficiency of the reaction. Another object is the preparation of surface active compositions which are of good color and odor, and can be used as a soap or a soap substitute or in conjunction with soap or soap substitutes. Still other objects will appear hereinafter.

In carrying out the processes of the aforementioned Reed patent, it has been found that substantial amounts of sulphonyl chlorides are formed, and that these products can be hydrolyzed to form soluble products of pronounced surface activity. It has been further found that a variation of the procedural conditions of the Reed patent leads to widely differing results.

When a hydrocarbon, for example, is reacted with a mixture of sulphur dioxide and chlorine as set forth, a number of competing reactions occur. It has been found that by increasing the ratio of sulphur dioxide to halogen, particularly, bromine and chlorine, that after hydrolysis the yield of solubilized products is greatly increased. Products containing varying amounts of halogen, e. g. chlorine directly connected to carbon including small amounts may be economically prepared according to the present process. Such products are highly desirable and may be prepared by using a material excess of sulphur dioxide to chlorine. A ratio of about 1 mol to 20 mols, preferably 2 to 6 mols of sulphur dioxide to 1 mol of chlorine has been found to be effective, and a ratio of 2.5 to 3.5 mols of sulphur dioxide to 1 mol of chlorine represents the preferred embodiment of the invention for all classes of materials treated.

Since many of the products made according to this reaction are later hydrolyzed and neutralized and are used as surface-active agents, it is important that they be as light colored in physical appearance as possible. It has been found that temperature has a very definite effect upon the color of the hydrolyzed and neutralized products, as well as upon the reaction itself. A proper balance of conditions and results must be made because the lower the temperature range, the slower the reaction rate. To obtain a light colored final product, it has been found that one must sacrifice the speed of the reaction. For saturated hydrocarbons and their derivatives and mixtures thereof, the temperatures should be between 30° and 80° C., and between 45° and 50° C. with saturated hydrocarbons to obtain clear products. Of course, when color is not a primary factor, any temperature that will not decompose the initial reactants and reaction products may be used. A practical range lies between —20° and +100° C.

While U. S. Patent No. 2,046,090 indicates that light has an effect on this reaction, it has been found that in general a light rich in wave lengths below 4500 A. is desirable. Suitable sources of short waved light include ultra-violet light derived from sources such as a mercury arc and rare gas lamps. Whereas ordinary clear or frosted electric light bulbs, e. g. 40 to 100 watt bulbs are mildly effective, higher wattage bulbs, e. g. 1000 to 1500 watt light bulbs or higher, carbon arcs including metal cored and metal salt cored carbon arcs, and photo flood lamps are markedly more effective. Sources of light containing at least 3% of ultra violet are particularly useful. The reaction vessel should contain a member which is permeable to ultraviolet light. A quartz tube or window or screen which allows ultra violet rays to go through may be incorporated in the apparatus and is quite effective. The screen may be selective and restrict the passage of far ultraviolet light. Rare gas lamps made of quartz tubes may be inserted directly into the reaction mixture.

The reaction may be continued for an indefinite length of time. However, it has been found that the length of the reaction also has a significant effect upon the product.

This method is applicable to all saturated hydrocarbon-containing materials. For each material one must determine the proper specific gravity for the end point by experiment. For example, the end point may be obtained by following the specific gravity change of the reaction mass. In the case of 40 viscosity white oil, the specific gravity at the end point is about 1.1.

As mentioned above, lightness in color of the final product is highly desirable. It has been found that after a material has been subjected to this reaction, there is a very rapid progressive darkening takes place on standing. We have found that the rate of darkening may be materially diminished if the reaction mass immediately after the reaction has been discontinued, is aerated with an inert gas such as nitrogen, sulphur dioxide, carbon dioxide, etc.

A very important factor in the successful operation of this reaction depends on the materials of construction of the reaction vessel. Materials which are not attacked by the reactants or products may be used. It has been found that materials such as stainless steel, iron, aluminum, copper and copper alloys, etc., are unsatisfactory inasmuch as ferric chloride or aluminum chloride is produced and acts as anticatalyst in this reaction. We have found that enamel, nickel, and nickel alloy vessels are satisfactory.

The invention will be further illustrated, but is not intended to be limited by the following examples:

EXAMPLE I

Four hundred parts of cetane were reacted with admixed gaseous sulphur dioxide and bromine by passing 1583 parts of $SO_2$ through 830 parts of $Br_2$ and leading the bromine saturated $SO_2$ into the bottom of a quartz flask which was provided with a reflux condenser filled with liquid cetane for a period of seven hours. The reaction zone was illuminated with ultra violet light from a mercury arc and also with the rays from a 60 watt tungsten filament incandescent light bulb. The lamps were placed about 6 inches from the quartz flask.

The product contained 14.05% total bromine and 4.33% elemental bromine as well as 0.53% sulphur.

The hydrolysis and neutralization products may be purified by removing the insoluble and unreacted oil by dilution and separation of the oil layer, by extraction with oil-dissolving solvents, by steam distillation to remove the unreacted oil, etc., which are disclosed and claimed in an application for Letters Patent of C. F. Reed, C. O. Henke and A. L. Fox, entitled "Purification of chemical compositions," filed upon June 30, 1938, Serial No. 216,842, now Patent No. 2,228,598, Jan. 14, 1941. The aqueous solution may be dried by evaporation, spray drying, drum drying, or other conventional means. By drum drying the above product, white flaky or powdery products are obtained.

This invention is not to be limited to the hydrolysis procedure set forth in the examples. For instance, the concentration of base, e. g. caustic soda used for hydrolyzing the reaction product obtained by treating hydrocarbons with sulphur dioxide and a halogen, especially chlorine and bromine, may be varied over a wide range. Concentrations of 0.5 to 50% are practical with most products. The reaction is somewhat slower with the more dilute caustic soda solutions and almost instantaneous with the more concentrated solutions. Other alkali metal hydroxides such as potassium, caesium, etc., may be used. Likewise, the alkaline earth metal hydroxides and oxides may be employed. An aqueous solution of ammonium hydroxide salts or amine salts may be obtained by hydrolyzing the product with aqueous solutions of aliphatic, cycloaliphatic, aromatic and heterocyclic amines, such as dimethylamine, ethylamine, diethylamine, and triethanolamine, piperidine, diethyl-cyclohexylamine, pyridine, aniline, toluidine, xylidines, β-naphthylamine, etc. Thus, the amine salts of the sulphonic acids may be obtained. Also, the strong quaternary ammonium bases such as tetramethyl-ammonium-hydroxide and tetra-ethyl-ammonium-hydroxide may be used for the hydrolysis. The resulting products would be the tetra-methyl-ammonium salt or the tetra-ethyl-ammonium salt of the hydrocarbon sulphonic acid. The preferred salt for use in most treating mercerizing liquors is, of course, the sodium salt. For use in acid or salt solutions, one of the amine or quaternary ammonium salts may be more desirable as possessing greater solubility.

Water-miscible organic solvents may be used during the hydrolysis or neutralization step to promote contact between the reaction mass and the hydrolyzing agents. As examples of such solvents, or diluents may be mentioned ethyl, propyl, methyl, etc., alcohols, dioxane, glycol and its ethers and esters, e. g. ethylene glycol, diethyl ether, dimethyl ether, etc.

In place of the above-described hydrocarbons or mixtures, any saturated hydrocarbon which is normally a liquid or easily liquefiable may be used. As examples of such compounds are various mineral oil fractions free from olefinic and naphthenic substituents, e. g. white oil, kerosene, paraffin wax, straight and branched chain saturated aliphatic hydrocarbons, e. g. normal and branched chain pentane, octane, nonane, decane, dodecane, tetradecane, pentadecane, hexadecane, octadecane, etc., cyclohexane, alkyl substituted cyclohexane, menthane, camphane, pinane, etc.

The preferred conditions may also be used with normally vaporous or gaseous reactants, or with any of the above-described reactants in the vapor phase.

The products produced according to this invention may be used for the same purposes as those described in aforementioned Reed, Henke and Fox application, and the applications referred to therein.

As many apparently widely different embodiments of this invention may be made without departing from the spirit and scope thereof, it is to be understood that I do not limit myself to the specific embodiments of the invention except as set forth in the appended claims.

I claim:

1. The process of making cetane sulphonyl bromide derivatives which comprises reacting cetane in the liquid phase with a gaseous mixture of sulphur dioxide and bromine containing from 1 to 20 mols of the former per mol of the latter, at a temperature from 30° C. to 80° C. while illuminating the reaction zone with a source of light containing more than 3% of ultra violet light.

2. The process of preparing hydrocarbon sulphonyl bromide derivatives which comprises reacting a non-gaseous saturated aliphatic hydrocarbon in the liquid phase with a gaseous mixture of sulphur dioxide and bromine containing from 1 to 20 mols of the former per mol of the latter at a temperature from 30° C. to 80° C. while irradiating the reaction zone with a source of light containing at least 3% of ultraviolet light, until the gain in weight is equal to that one would get if one sulphur dioxide molecule and two bromine atoms were entered into the molecule.

3. The process of making cetane sulphonyl bromide derivatives which comprises passing gaseous sulphur dioxide into bromine thereby saturating the sulphur dioxide with bromine and reacting the bromine-saturated sulphur dioxide vapors with liquid cetane in a quartz vessel for a period of seven hours while irradiating the reaction zone with the ultraviolet light radiations from a mercury vapor lamp.

ARTHUR L. FOX.